United States Patent Office 3,631,154
Patented Dec. 28, 1971

3,631,154
POLYESTER POLYACRYLATE AND COMPOSITION COMPRISING THE SAME
Takeo Kawaguchi, Kishichiro Kondo, Hiroyuki Kato, Ken Maniwa, Kenji Ito, Ariyuki Hirano, Isao Thuzi, and Hidemaro Tatemichi, Nagoya, Japan, assignors to Toagasei Chemical Industry Co., Ltd., Tokyo, Japan
No Drawing. Filed Feb. 6, 1970, Ser. No. 9,415
Claims priority, application Japan, Feb. 14, 1969, 44/10,455
Int. Cl. C08f 3/62
U.S. Cl. 260—76
6 Claims

ABSTRACT OF THE DISCLOSURE

Novel polyester polyacrylate monomers are prepared by the esterification reaction of glycols with acrylic or methacrylic acid and polycarboxylic acids in the presence of esterification catalysts and polymerization inhibitors. Adhesive compositions composed of these monomers, a peroxide, a polymerization accelerator and preferably a stabilizer have a long shelf life when stored with access to oxygen, and a rapid set time when oxygen is excluded. The bonds formed with these compositions have excellent strength and resistance to alkalis.

This invention relates to a novel polyester polyacrylate monomer, and an anaerobic-cure composition useful as an adhesive, which comprises said novel monomer as a principal component.

There have been already published in Doklady Akad. Nauk. S.S.S.R., 123, 282–4 (1958) and in Vyskomolekulyariye Soedineniya, 2, 441–16 (1960) reports concening polyester diacrylate and polyester dimethacrylate obtained by reacting ethylene glycol with dibasic acids such as phthalic acid, maleic acid, malonic acid, etc., and acrylic acid or methacrylic acid.

An object of the present invention is to provide a novel polyester polyacrylate monomer obtained by esterification reaction of a glycol with an acrylic acid, substituted or unsubstituted, and a polycarboxylic acid or an anhydride thereof, said polycarboxylic acid being at least one member selected from the group consisting of tricarboxylic acids, tetracarboxylic acids, tetrahydrophthalic acids, and itaconic acid, in the presence of an esterification catalyst, an azeotropic-dehydration agent, and a polymerization inhibitor.

Another object of the invention is to provide an anaerobic-cure composition useful as an adhesive, which comprises said novel polyester polyacrylate monomer as a principal component.

Throughout this specification and appended claims, the term "anaerobic-cure composition" means the composition that cures only in the absence of oxygen. The term "acrylic acids" is used herein to include acrylic acid, α-substituted acrylic acids such as methacrylic acid, α-haloacrylic acids, and α-ethylacrylic acid, and mixtures thereof, and the same shall apply to the term "polyester polyacrylate" herein used. The term "polycarboxylic acids" is used herein to include tricarboxylic acids, tetracarboxylic acids, tetrahydrophthalic acids, itaconic acid, and mixtures thereof. The term "esterification reaction" is used herein to include the case wherein polycarboxylic acids, glycols, and acrylic acids are simultaneously reacted together to form esters, and the case wherein glycols are reacted first with either polycarboxylic acids or acrylic acids, and then reacted with remaining ones to form polyester polyacrylates.

The structural formulas of the present polyester polyacrylate monomers are presumably as follows:

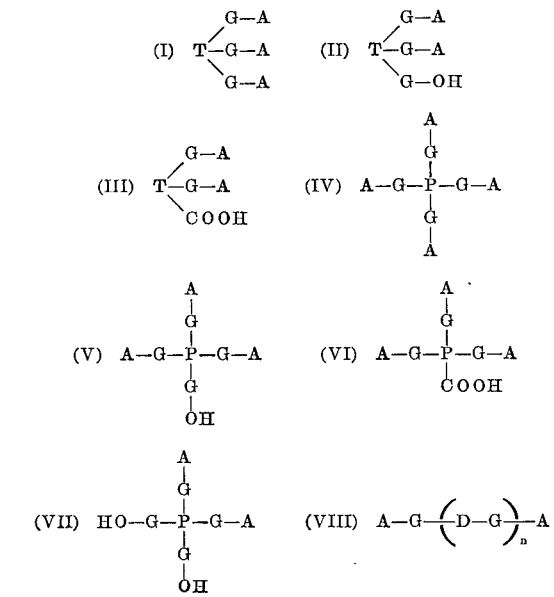

In the above formulas, T and P are the residues derived from a tricarboxylic acid and a tetracarboxylic acid respectively by eliminating carboxy groups therefrom; G is the residue derived from a glycol by eliminating hydroxy groups therefrom; A is the residue derived from an acrylic acid by eliminating a carboxy group therefrom; D is the residue derived from a tetrahydrophthalic acid or itaconic acid by eliminating carboxy groups therefrom; and n is an integer of 1 to 5; said residues being united with each other through an interposed ester linkage

In addition to above-mentioned types, the formation of polyester polyacrylates containing in the molecules two or more residues of carboxylic acid or tetracarboxylic acid are probable.

Each type of the polyester polyacrylate monomers corresponding to each formula from (I) to (VIII) can be prepared almost selectively by using polycarboxylic acid, glycol, and acrylic acid in a predetermined mole ratio.

General procedures for preparing the present monomers are as follows:

A mixture of polycarboxylic acid, glycol, acrylic acid, esterification catalyst, polymerization inhibitor, and azeotropic-dehydration agent is heated in a reactor while recycling the azeotropic-dehydration agent to the reactor after being separated from the azeotropically distilled water (one-step procedure). Alternatively, a mixture of polycarboxylic acid (or acrylic acid containing polymerization inhibitor), glycol, esterification catalyst, and azeotropic-dehydration catalyst is heated while recycling the azeotropic-dehydration agent as above and then after addition of acrylic acid containing polymerization inhibitor (or polycarboxylic acid alone), the mixture is again heated while recycling the azeotropic-dehydration agent as before (two-step procedure).

The reaction liquid, after being cooled, is washed with an aqueous alkaline solution, freed from the azeotropic-dehydration agent under reduced pressure, and treated with a solid adsorbent, to give the desired polyester polyacrylate.

As the esterification catalyst, there are used sulfuric acid, hydrochloric acid, benzenesulfonic acid, p-toluenesulfonic acid, etc.

Polymerization inhibitors used are hydroquinone, p-benzoquinone, p - tert - butyl-catechol diphenylamine, thiosemicarbazide, sulphur, phenothiazine, hydroquinone monomethyl ether, etc.

As the azeotropic-dehydration agent there are used compounds that are capable of forming azeotropic mixtures with water, are immiscible with water, and are chemically stable under reaction conditions. Examples of said compounds include, for example, cyclohexane, benzene, toluene, n-hexane, trichloroethylene, isopropyl ether, etc.

The preferred reaction temperature is from 70° to 120° C., depending upon the kind and amount of the azeotropic-dehydration agent used.

The reaction period is usually from 6 to 12 hours.

The polymerization inhibtor should be added in an amount sufficient to inhibit polymerization until completion of the reaction.

The progress of the reaction can be followed by measuring the amount of water formed and the reaction may be deemed complete when more than 95% of the theoretical amount of water has distilled.

The solid adsorbents used are activated carbon, ion-exchange resin, silica gel, molecular sieve, "Celite," activated alumina, etc.

Examples of the particular embodiment of the preparation of each type of the present monomers, corresponding to the Formulas I to VIII, are as follows:

The monomer containing compound of type (I) as the principal component: 3 moles of a glycol are reacted with 1 mole of a tricarboxylic acid and 3 to 3.3 moles of an acrylic acid (one-step or two-step procedure).

The monomer containing compound of type (II) as the principal component: 3 moles of a glycol are reacted with 1 mole of a tricarboxylic acid and 2 to 2.2 moles of an acrylic acid (one-step or two-step procedure).

The monomer containing compound of type (III) as the principal component: 2 moles of a glycol are first reacted with 2 moles of an acrylic acid, and then reacted with 1 mole of a tricarboxylic acid (two-step procedure).

The monomer containing compound of type (IV) as the principal component: 4 moles of a glycol are reacted with 1 mole of a tetracarboxylic acid and 4 to 4.4 moles of an acrylic acid (one-step or two-step procedure).

The monomer containing compound of type (V) as the principal component: 4 moles of a glycol are reacted with 1 mole of a tetracarboxylic acid and 3 to 3.3 moles of an acrylic acid (one-step or two-step procedure).

The monomer containing compound of type (VI) as the principal component; 3 moles of a glycol are first reacted with 3 moles of an acrylic acid, and then reacted with 1 mole of a tetracarboxylic acid (two-step procedure).

The monomer containing compound of type (VII) as the principal component: 4 moles of a glycol are first reacted with 1 mole of a tetracarboxylic acid, and then reacted with 2 to 2.2 moles of an acrylic acid (two-step procedure).

The monomer containing compound of type (VIII) as the principal component: A little more than 2 moles of a glycol are reacted with 1 mole of a tetrahydrophthalic acid or itaconic acid and a little more than 2 moles of an acrylic acid (one-step or two-step procedure).

The polycarboxylic acids used in the preparation of the present polyester polyacrylate monomer are tricarboxylic acids such as trimellitic acid and other benzenetricarboxylic acids, citric acid, aconitic acid, etc.; tetracarboxylic acids such as pyromellitic acid and other benzenetetracarboxylic acids, butane-1,2,3,4-tetracarboxylic acid, etc.; tetrahydrophthalic acids such as $\Delta^3$-tetrahydro- and $\Delta^4$-tetrahydro-phthalic acid; and anhydrides of these polycarboxylic acids.

The glycols used in the preparation of the present monomer are diethylene glycol, triethylene glycol, tetraethylene glycol, dipropylene glycol, polyethylene glycol, ethylene glycol, propylene glycol, 1,3-butanediol, 1,4-butanediol, thiodiglycol, etc.

The acrylic acids used in the preparation of the present monomer are unsubstituted acrylic acid and α-substituted acrylic acids such as methacrylic acid, α-haloacrylic acids, α-ethylacrylic acid, etc.

The novel monomer of the present invention can be mixed with various peroxides and polymerization accelerators to produce an anaerobic-cure composition useful as an adhesive.

The peroxides used in said composition are ketone peroxides, peresters, diacyl peroxides, dialkyl peroxides, hydroperoxides, hydrogen peroxide, etc., and are usually used in an amount of 1 to 10 percent by weight based on the monomer.

The polymerization accelerators used are amines such as tertiary amines, oximes, thiurams, Malachite Green, etc. Examples of amines include triethylamine, tributylamine, tripropylamine, N,N-dimethylaniline, N,N-dimethyl-p-toluidine, N,N - dimethylcyclohexylamine, N,N - dimethylbenzylamine, N - methylmorpholine, triethanolamine, ethyldiethanolamine, pyridine, etc. These amines are used in an amount of 0.01 to 5 percent by weight based on the weight of the monomer.

As the examples of oximes used in the present composition, may be cited methyl ethyl ketoxime, methyl isobutyl ketoxime, acetophenone oxime, p-benzoquinone oxime, butyl aldoxime, cyclohexanone oxime, p,p' - dibenzoylquinone oxime, etc. Oximes are used in an amount of 0.01 to 5 percent by weight based on the weight of the monomer.

Thiurams used are thiuram disulfide.

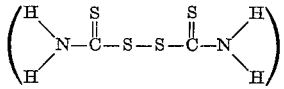

tetramethylthiuram monosulfide

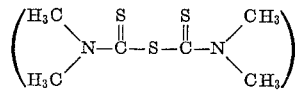

tetraethylthiuram monosulfide, etc. The amount of thiurams to be added is 0.001 to 1 percent by weight based on the monomer.

Malachite Green is used generally as a hydrochloride or a salt with oxalic acid in an amount of 0.01 to 1 percent by weight based on the monomer. The accelerating action of Malachite Green on the setting of the present composition seems to be based upon the chemical structure of the former. It seems that two of the three substituted phenyl groups attached to a single carbon atom have an accelerating action while the remaining one has a stabilizing action. Various compounds of the triphenylmethane group including Malachite Green have more or less accelerating effect on the setting of the preset composition, their salts with amine or hydrogen chloride being more effective than those with alkali metals such as sodium or potassium. However, Malachite Green is the most effective among triphenylmethane compounds.

Each polymerization accelerator, mentioned above, can be used in a suitable combination with each other. An excess amount of peroxide, tertiary amines, oximes, thiurams, or Malachite Green can be used without causing any harmful result, but the sufficient amount in practice is in the range given above.

The stability of the present anaerobic-cure composition can be improved by addition of oxalic acid in an amount of 0.0001 to 0.1, preferably 0.001 to 0.05 percent by weight based on the monomer. Although the role played by oxalic acid in the present composition is not clear, it seems that in the presence of air oxalic acid suppresses the activity of the redox system consisting of the peroxide and accelerator in the composition, and in the absence of air said redox system regains its activity. In this respect the effect of oxalic acid is similar to that of an ordinary polymerization inhibitor such as hydroquinone, hydroquinone monomethyl ether, tert-butylcatechol, etc., but oxalic acid itself is not an inhibitor of free radical polymerization. It seems probable that in the presence of air oxalic acid suppresses the action of the amine in the redox system, and as soon as air is excluded from the composition the suppressive action of oxalic acid becomes weaker resulting in reactivation of the redox system. Also, it is probable that when the composition containing oxalic acid is applied to the tightly fitted metal parts such as bolt/nut, the oxalic acid forms a redox system with the metal to accelerate the setting of the composition.

The addition of a polymerization inhibitor or a UV-absorber in an amount of 0.005 to 0.1 percent by weight based on the monomer is effective in stabilizing the composition. Such stabilizers include, for example, hydroquinone, p-benzoquinone, phenyl salicylate, 4-tert-butylphenyl salicylate, 2,4-dihydroxybenzophenone, 2(2'-hydroxy-5'-methylphenyl)-benzotriazole, etc.

If desired, pigments and thickening agents can be added to the composition.

The outstanding features of the present composition are a rapid setting in the absence of air with a rate which is the same as or even superior to that of any composition so far known to the art, and an excellent storage stability. It has been considered very difficult to prepare a composition of this sort that has both a good storage stability and a rapid-setting property, these two properties generally being contradictory to each other.

Whilst the present composition comprising the present monomer, a peroxide, a polymerization accelerator, and preferably a stabilizer, does not polymerize in 6 months when stored in an open air at room temperature, it is capable of manifesting its anaerobic-cure ability to full extent in the rapid commencement of polymerization when it is applied to a crevice as narrow as 0.01 to 0.2 mm. left between two substrates such as metals, to produce a bond having a high adhesive strength and an excellent resistance to heat and chemicals.

The invention will be further illustrated in detail by the following examples and comparative examples.

EXAMPLE 1 AND COMPARATIVE EXAMPLE 1

192 g. (1 mole) of trimellitic anhydride, 318 g. (3 moles) of diethylene glycol, 271 g. (3.15 moles) of methacrylic acid, 3,000 g. of benzene, 25 g. of 98%-sulfuric acid, and 0.3 g. of phenothiazine were heated in a reactor. The water formed by the reaction continually distilled out of the reactor as an azeotropic mixture with benzene, and the benzene was recycled to the reactor after being separated from water on cooling said azeotropic mixture. When 81 g. of water were removed azeotropically, the reaction was stopped by cooling the reactor. The liquid reaction product was washed with 300 g. of a 5%-aqueous ammonia solution, and distilled under a reduced pressure of 50 mm. Hg to remove benzene at a temperature below 60° C. Then the reaction product was treated with 5% by weight of an activated alumina for 30 min. to give 625 g. of a polyester polyacrylate monomer, a yellow substance having an acid value of 0.8 and a molecular weight of 690, which corresponds to that of trimellityl diethylene glycol trimethacrylate of the type (I) (calculated molecular weight, 678).

The monomer of the type (I) thus obtained was uniformly mixed with 5% by weight of tert-butyl hydroperoxide and 1% by weight of N,N-dimethylaniline. The resultant composition was placed in a polyethylene container and left standing in the presence of air in a room. After 6 months, no gelation of the composition was observed. A few drops of the composition were applied to the mating part of a ⅜" bolt/nut. The breaking torque strength of the bond after 24 hours was 250 kg.-cm.

Tests for tensile strengths at elevated temperatures were run for the bonds provided by said composition and by a composition (Comparative Example 1) of the tetraethylene glycol dimethacrylate type, available on the market. The bonds weer prepared and tested according to the method described below. Tensile strengths at 150° C. were as follows:

|  | Kg.-cm. |
|---|---|
| Example 1 | 90 |
| Comparative Example 1 | 45 |

Testing method for tensile strength at elevated temperatures:

The surface of a mild steel specimen, 10 (width) x 35 (length) x 5 (thickness) mm., which had been ground with a dead-smooth-cut hand file, was coated with a drop of an anaerobic-cure composition to cover an area of 10 x 5 mm., and mated with an uncoated similar specimen. After being allowed to stand at room temperature for 24 hours, the test specimen was secured in position on a Schopper tensile tester equipped with a constant temperature bath. After 15 min., when the temperature of the specimen had been equilibrated with the temperature of the bath maintained at 150° C., the tensile strength of the bond was measured at a tensile rate of 10 mm./min.

EXAMPLE 2

1 mole of trimellitic anhydride, 3 moles of triethylene glycol, and 2.1 moles of methacrylic acid were allowed to react in the same way as in Example 1, to obtain 655 g. of a yellow substance having an acid value of 0.1 and a molecular weight of 764, which corresponds to that of trimellityl triethylene glycol dimethacrylate mono-ol of the type (II) (calculated molecular weight, 742).

The monomer thus obtained was uniformly mixed with 5% by weight of tert-butyl hydroperoxide and 1% by weight of N,N-dimethylaniline. The resultant composition was placed in a polyethylene container, and left standing in the presence of air in a room. After 6 months, no gelation was observed. A few drops of the composition which were applied to the mating part of a ⅜" bolt/nut, was set in one hour. After 24 hours, the breaking torque strength of the bond was 330 kg.-cm. The tensile strength at 150° C., as measured by the method described in Example 1, was 105 kg.-cm.

EXAMPLE 3

1 mole of pyromellitic anhydride, 4 moles of diethylene glycol, and 4.2 moles of methacrylic acid were allowed to react in the same way as in Example 1, to obtain 801 g. of a yellowish brown substance having an acid value of 1.2 and a molecular weight of 866, which corresponds to pyromellityl diethylene glycol tetramethacrylate of the type (IV) (calculated molecular weight, 878).

The monomer thus obtained was uniformly mixed with 5% by weight of cumene hydroperoxide and 1% by weight of N,N-dimethylaniline. The resultant composition was placed in a polyethylene container, and left standing in the presence of air in a room. After 6 months, no gelation was observed. A few drops of the composition which were applied to the mating part of a ⅜" bolt/nut, was set in one hour. After 24 hours, the breaking torque strength of the bond was 270 kg.-cm. The tensile strength at 150° C., as measured by the method described in Example 1, was 85 kg.-cm.

EXAMPLE 4

300 g. (2 moles) of triethylene glycol, 172 g. (2 moles) of methacrylic acid, 3,000 g. of benzene, 20 g. of sulfuric acid, and 5 g. of hydroquinone monomethyl ether were heated in a reactor while azeotropically removing the water formed by the esterification reaction. When 35 g. of water were removed, 174 g. (1 mole) of aconitic acid was added to the resultant ester, and the mixture was further heated while removing water azeotropically. After removal of further 35.5 g. of water the reaction was stopped by cooling. The reaction product was washed with 500 g. of a 5%-aqueous sodium hydroxide solution, stripped of benzene at a temperature below 60° C. by distillation under reduced pressure of 50 mm. Hg, and treated with 5% by weight of an activated alumina. There were obtained 533 g. of a yellow substance having an acid value of 91.0 and a molecular weight of 590, which corresponds to that of aconityl triethylene glycol dimethacrylate monocarboxylic acid of the type (III) (calculated molecular weight, 574).

EXAMPLE 5

1 mole of pyromellitic anhydride, 4 moles of diethylene glycol, and 3 moles of methacrylic acid were allowed to react in the same way as in Example 1, to obtain 749 g. of a yellow substance having an acid value of 0.4 and a molecular weight of 841, which corresponds to pyromellityl diethylene glycol trimethylacrylate mono-ol of the type (V) (calculated molecular weight, 810).

EXAMPLE 6

3 moles of tetraethylene glycol, 3 moles of methacrylic acid, and 1 mole of pyromellitic anhydride were allowed to react in the same way as in Example 5, to obtain 907 g. of a yellowish brown substance having an acid value of 52.5 and a molecular weight of 1,054, which corresponds to pyromellityl tetraethylene glycol trimethacrylate monocarboxylic acid of the type (VI) (calculated molecular weight, 986).

EXAMPLE 7

1 mole of pyromellitic anhydride, 4 moles of diethylene glycol, and 2 moles of methacrylic acid were allowed to react in the same way as in Example 1, to obtain 699 g. of a yellow substance having an acid value of 0.2 and a molecular weight of 721, which corresponds to that of pyromellityl diethylene glycol dimethacrylate diol of the type (VII) (calculated molecular weight, 742).

Each monomer, obtained in Examples 4, 5, 6 and 7, was uniformly mixed with 5% by weight of tert-butyl hydroperoxide and 1% by weight of N,N-dimethylaniline. Each resultant composition was placed in a polyethylene container, and left standing in the presence of air in a room. After 6 months, no gelation was observed in any one of the containers. A few drops of each composition which were applied to the mating part of a ⅜" bolt/nut, was set in one hour. After 24 hours, the breaking torque strengths of the bonds were found to be as follows:

|  | Kg.-cm. |
|---|---|
| Example 4 | 230 |
| Example 5 | 280 |
| Example 6 | 350 |
| Example 7 | 290 |

EXAMPLE 8 AND COMPARATIVE EXAMPLE 2

65 g. (0.5 mole) of itaconic acid, 150 g. (1 mole) of triethylene glycol, 90.5 g. (1 mole) of methacrylic acid, 600 g. of benzene, 4 g. of 98% sulfuric acid, and 0.03 g. of phenothiazine were heated in a reactor. The water formed by the reaction was continually distilled out of the reactor as an azeotropic mixture with benzene, and the benzene was recycled to the reactor after being separated from water on cooling said azeotropic mixture. When 35.1 g. of water were removed azeotropically, the reaction was stopped by cooling. The liquid reaction product was washed with 100 g. of a 5% aqueous ammonia solution, and distilled under a reduced pressure of 50 mm. Hg to remove benzene at a temperature below 60° C. Then the reaction product was treated with 5% by weight of an activated alumina for 30 min. to give 250 g. of a polyester polymethacrylate monomer, a yellow substance having an acid value of 0.8 and a molecular weight of 575, which corresponds to that of itaconyl triethylene glycol dimethacrylate (calculated molecular weight, 530).

The monomer thus obtained was uniformly mixed with 5% by weight of cumene hydroperoxide, 1% by weight of N,N-dimethylaniline, and 0.01% by weight of 2(2'-hydroxy-5'-methylphenyl)benzotriazole (a UV-absorber). The resultant composition was placed in a polyethylene container (in red color to absorb ultraviolet rays; the same shall apply hereinafter) in the presence of air, and was stored. After 3 months of storage no gelation was observed. When said composition had been placed in a nitrogen atmosphere, gelation occurred in 2 hours. A few drops of the composition were applied to the mating part of a ⅜" bolt/nut. The breaking torque strength of the bond after 24 hours was 120 kg.-cm.

While polymers of the vinyl type are generally susceptible to the effect of alkalis, the excellent chemical resistance of the present composition is evident from the following test results.

For comparison, two other compositions of a formulation similar to that of the composition mentioned above. were prepared using as a principal component succinyl triethylene glycol dimethacrylate (Comparative Example 2) which have no double bond in the side chain, and triethylene glycol dimethacrylate (Comparative Example 3) which was prepared without using dicarboxylic acid. Three compositions including the composition of the invention were each applied to the mating area of the ⅜" bolt/nut and immersed in a 10%-aqueous sodium hydroxide solution at room temperature. After 15 days of immersion, each bolt/nut was washed with water and air-dried. The breaking torque strengths of the bonds provided by said three compositions were as follows:

|  | Before immersion, kg.-cm. | After immersion, kg.-cm. |
|---|---|---|
| Example 8 | 120 | 110 |
| Comparative Example 2 | 80 | 25 |
| Comparative Example 3 | 75 | 30 |

EXAMPLE 9 AND COMPARATIVE EXAMPLE 4

76 g. (0.5 mole) of Δ⁴-tetrahydrohthalic anhydride, 106 g. (1 mole) of diethylene glycol, 90.5 g. (1.05 moles) of methacrylic acid, 600 g. of benzene, 4 g. of 98%-sulfuric acid, and 0.02 g. of phenothiazine were allowed to react in a reactor in a way similar to that in Example 8. There was obtained 221 g. of a yellow product having an acid value of 0.7 and a molecular weight of 501, which corresponds to that of tetrahydrophthalyl diethylene glycol dimethacrylate (calculated molecular weight, 482).

The monomer thus obtained was uniformly mixed with 5% by weight of tert-butyl hydroperoxide and 1% by weight of N,N-dimethylaniline. The resultant composition was placed in a polyethylene container in the presence of air, and was stored. After 3 months of storage no gelatin was observed. When said composition had been placed in a nitrogen atmosphere, gelation took place in 2 hours. A few drops of the composition were applied to the mating area of a ⅜" bolt/nut. The breaking torque strength of the bond after 24 hours was 250 kg.-cm.

A composition of a formulation similar to that of the above-mentioned composition was prepared using as a principal component phthalyl diethylene glycol dimethacrylate which was prepared using phthalic anhydride instead of tetrahydrophthalic acid (Comparative Example 4).

Both compositions, mentioned above, were each applied to the mating area of the ⅜" bolt/nut and immersed in a 10%-aqueous sodium hydroxide solution at room temperature. After immersion of 15 days each bolt/nut was washed with water and air-dried. The breaking torque strengths of the bonds provided by said two compositions were as follows:

|  | Before immersion, kg.-cm. | After immersion, kg.-cm. |
|---|---|---|
| Example 9 | 250 | 200 |
| Comparative Example 4 | 260 | 150 |

EXAMPLE 10

65 g. (0.5 mole) of itaconic acid, 194 g. (1 mole) of tetraethylene glycol, 90.5 (1.05 moles) of acrylic acid, 650 g. of benzene, 4 g. of 98%-sulfuric acid and 0.04 g. of phenothiazine were allowed to react in a way similar to that in Example 8. There was obtained 273 g. of a yellow product having an acid value of 1.1 and a molecular weight of 683, which corresponds to that of itaconyl tetraethylene glycol diacrylate (calculated molecular weight, 690).

The monomer thus obtained was uniformly mixed with 5% by weight of cumene hydroperoxide, 1% by weight of N,N-dimethylaniline, and 0.01% by weight of 2,4-dihydroxybenzophenone. The resultant composition was placed in a polyethylene container in the presence of air, and was stored. After 3 months of storage, no gelation was observed. When said composition had been placed in a nitrogen atmosphere, gelation took place in 2 hours. A few drops of the composition were applied to the mating area of a ⅜″ bolt/nut. The breaking torque strength of the bond after 24 hours was 95 kg.-cm. After immersion in a 10%-aqueous sodium hydroxide solution at room temperature for 15 days, the breaking torque strength of the bond was 70 kg.-cm.

EXAMPLE 11

76 g. (0.5 mole) of Δ⁴-tetrahydrophthalic acid, 76 g. (1.0 mole) of propylene glycol, 90.5 g. (1.05 mole) of methacrylic acid, 600 g. of benzene, 3 g. of 98%-sulfuric acid, and 0.03 g. of phenothiazine were allowed to react in a way similar to that in Example 8. There was obtained 197 g. of a yellow product having an acid value of 1.2 and a molecular weight of 499, which corresponds to that of tetrahydrophthalyl propylene glycol dimethacrylate (calculated molecular weight, 476).

The monomer thus obtained was uniformly mixed with 5% by weight of tert-butyl hydroperoxide and 1% by weight of N,N-dimethylaniline. The resultant composition was placed in a polyethylene container in the presence of air, and stored. After storage for 3 months, no gelation was observed, while gelation took place in 2 hours when placed in a nitrogen atmosphere. A few drops of the composition were applied to the mating area of a ⅜″ bolt/nut (iron). The breaking torque strength of the resulting bond after 24 hours was 180 kg.-cm., and that measured after immersion in a 10%-aqueous sodium hydroxide solution for 15 days was 160 kg.-cm.

EXAMPLE 12

195 g. (1.5 moles) of itaconic acid, 212 g. (2 moles) of diethylene glycol, 90.5 g. (1.05 moles) of methacrylic acid, 1,200 g. of toluene, 7 g. of 98%-sulfuric acid, and 0.06 g. of phenothiazine were heated in a reactor. The water formed by the reaction was continually distilled out of the reactor as an azeotropic mixture with toluene, and the toluene was recycled to the reactor after being separated from water on cooling said azeotropic mixture. When 70.0 g. of water was removed azeotropically, the reaction was stopped by cooling. The liquid reaction product was washed with an aquezous solution containing 3% of ammonia and 10% of ammonium sulfate, and distilled under a reduced pressure of 20 mm. Hg to remove toluene at a temperature below 60° C. Then the reaction product was treated with 3% by weight of an activated alumina for 15 min. to give 395 g. of polyester dimethylacrylate, a yellow substance having an acid value of 1.0 and a molecular weight of 881, which corresponds to that of itaconyl diethylene glycol dimethacrylate of the type (VIII), wherein $n=3$.

The monomer thus obtained was uniformly mixed with 5% by weight of cumene hydroperoxide and 1% by weight of N,N-dimethylaniline. The resultant composition was placed in a polyethylene container in the presence of air, and stored. After storage for 3 months, no gelation was observed, while gelation took place in 2 hours when placed in a nitrogen atmosphere. The breaking torque strength of the bond prepared in the same way as in Example 8, was 90 kg.-cm., and that measured after immersion in 10%-aqueous sodium hydroxide solution was 75 kg.-cm.

EXAMPLES 13–14 AND 14–2

The following compositions were prepared using the monomer (trimellityl triethylene glycol dimethacrylate) obtained in Example 2.

| Example | 13 | 14 | 14–2 |
|---|---|---|---|
| Composition (parts by weight): | | | |
| Monomer | 100 | 100 | 100 |
| Tert-butyl hydroperoxide | 2 | 2 | 2 |
| N,N-dimethylaniline | 1 | 1 | 1 |
| p-Benzoquinone oxime | 1 | 1 | |
| Tetramethylthiuram monosulfide | | 0.007 | |

Tests were run on said compositions for set time, storage stability, and breaking torque strength of bond, to obtain the results as shown in the following table.

| Composition of— | Set time, min. | Storage stability at 80° C., min. | Breaking torque strength, kg.-cm. |
|---|---|---|---|
| Example 13 | 45 | 180 | 280 |
| Example 14 | 40 | 180 | 300 |
| Example 14–2 | 90 | 30 | 270 |

EXAMPLES 15 AND 15–2

The following compositions were prepared based on the monomer (tetrahydrophthalyl diethylene glycol dimethacrylate) obtained in Example 9.

| Example | 15 | 15–2 |
|---|---|---|
| Composition (parts by weight): | | |
| Monomer | 100 | 100 |
| Cumene hydroperoxide | 1 | 1 |
| N,N-dimethylaniline | 0.5 | 0.5 |
| Tetramethylthiuram monosulfide | 0.01 | |

Tests were run on said compositions for set time, storage stability, and breaking torque strength of bond, to obtain the results as shown in the following table.

| Composition of— | Set time, min. | Storage stability at 80° C., min. | Breaking torque strength, kg.-cm. |
|---|---|---|---|
| Example 15 | 35 | 210 | 350 |
| Example 15–2 | 110 | 40 | 360 |

EXAMPLES 16 AND 16–2

A composition was prepared from 100 parts of tetrahydrophthalyl triethylene glycol dimethacrylate, 1 part of cumene hydroperoxide, 0.5 part of N,N-dimethylaniline. and 0.04 part of Malachite Green (Example 16). Another composition was prepared with the same formulation as that of Example 16 except for the omission of Malachite Green (Example 16–2). Results of the tests on both compositions were as shown in the following table.

| Composition of— | Set time, min. | Storage stability at 80° C., min | Breaking torque strength, kg.-cm. |
|---|---|---|---|
| Example 16 | 60 | 300 | 250 |
| Example 7 | 75 | 120 | 270 |

EXAMPLES 17 AND 17-2

A composition was prepared from 100 parts of the monomoer (trimellityl triethylene glycol dimethacrylate mono-ol) obtained in Example 2, 2 parts of tert-butyl hydroperoxide, 1 part of N,N-dimethylaniline, 1 part of p-benzoquinone oxime, 0.007 part of tetramethylthiuram monosulfide, and 0.04 part of Malachite Green (Example 17). Another composition was prepared with the same formulation as that of Example 17 except for the omission of Malachite Green (Example 17-2). Results of the tests on both compositions were as shown in the following table.

| Composition of— | Set time, min. | Storage stability at 80° C., min. | Breaking torqu, strength kg.-cm |
|---|---|---|---|
| Example 17 | 45 | 330 | 290 |
| Example 17-2 | 40 | 180 | 300 |

EXAMPLES 18–19, 18-2 AND 19-2

Compositions based on tetrahydrophthalyl diethylene glycol dimethacrylate (monomer I) or trimellityl diethylene glycol dimethacrylate (monomer II) were prepared to give the following test results.

| Example | 18 | 19 | 18-2 | 19-2 |
|---|---|---|---|---|
| Composition (parts by weight): | | | | |
| Monomer I | 100 | | 100 | |
| Monomer II | | 100 | | 100 |
| Cumene hydroperoxide | 2 | 1 | 2 | 1 |
| N,N-dimethylaniline | 2 | 1 | 2 | 1 |
| Oxalic acid | 0.01 | 0.01 | | |
| Properties: | | | | |
| Set time, min | 55 | 80 | 60 | 90 |
| Storage stability, min | 200 | 220 | 30 | 30 |

EXAMPLES 20, 20-2 AND 20-3

Test results on the compositions based on tetrahydrophthalyl diethylene glycol dimethacrylate monomer were as shown in the following table.

| Example | 20 | 20-2 | 20-3 |
|---|---|---|---|
| Composition (parts by weight): | | | |
| Monomer | 100 | 100 | 100 |
| Cumene hydroperoxide | 1 | 1 | 1 |
| N,N-dimethylaniline | 0.5 | 0.5 | 0.5 |
| Tetramethylthiuram monosulfide | 0.01 | 0.01 | |
| Oxalic acid | 0.01 | | |
| Properties: | | | |
| Set time, min | 30 | 35 | 110 |
| Storage stability, min | 300 | 210 | 40 |

In all the examples and comparative examples given herein, the testing procedures employed were as follows:

(1) Testing procedure for set time

A few drops of the composition to be tested were applied onto the threaded part of a ⅜″ bolt/nut, and the assembled bolt/nut was left standing at room temperature. The time elapsed until the nut can no longer be moved was taken as set time, which is useful for evaluating the rapidity of cure of the composition.

(2) Testing procedure for storage stability 1 ml. of the composition to be tested was placed in a 2 ml.-polyethylene container with a tightly fitted stopper, and placed in an oven maintained at a temperature of 80±2° C. The time elapsed until gelation began to occur was taken as storage stability, which is useful for evaluating the shelf life of the composition.

(3) Testing procedure for breaking torque strength

A ⅜″ bolt/nut was fixed by bonding with the composition to be tested. After being cured for 24 hours at room temperature, the torque required to break the bond was measured by means of a torque wrench.

What is claimed is:

1. An anaerobic-cure composition comprising a peroxide, a tertiary amine and a polyester polyacrylate prepared by the esterification reaction of a glycol with an acrylic acid, substituted or unsubstituted, and at least one of the polycarboxylic acids selected from the group consisting of tricarboxylic acids, tetracarboxylic acids, tetrahydrophthalic acids, itaconic acid, and anhydrides of these acids, in the presence of an esterification catalyst, an azeotropic-dehydration agent and a polymerization inhibitor.

2. A composition according to claim 1 wherein said composition contains, in addition, at least one of the polymerization accelerators selected from the group consisting of oxalic acid, oximes, thiurams, and Malachite Green.

3. A composition according to claim 1 wherein the tricarboxylic acids are benzenetricarboxylic acids and aconitic acid.

4. A composition according to claim 1 wherein the tetracarboxylic acids are benzenetetracarboxylic acids.

5. A composition according to claim 1 wherein the polycarboxylic acids are benzenetricarboxylic acids, aconitic acid, or benzenetetracarboxylic acids.

6. A composition according to claim 1 wherein the acrylic acid is at least one member selected from the group consisting of acrylic acid (unsubstituted acrylic acid) and methacrylic acid.

References Cited
UNITED STATES PATENTS 3,249,656  5/1966  Kalinowski et al. ____ 260—885
3,300,547  1/1967  Gorman et al. _____ 260—885

JOSEPH L. SCHOFER, Primary Examiner

J. KIGHT III, Assistant Examiner

U.S. Cl. X.R.

156—332; 161—214; 260—45.7 R, 45.8 N, 45.95, 75 UA, 78.4 E

UNITED STATES PATENT OFFICE
CERTIFICATE OF CORRECTION

Patent No. 3,631,154          Dated December 28, 1971

Inventor(s) Takeo KAWAGUCHI et al

It is certified that error appears in the above-identified patent and that said Letters Patent are hereby corrected as shown below:

Column 1, lines 8 and 9, the claim for priority should read as follows:

Claims priority, applications Japan, February 14, 1969; March 1, 1969; March 17, 1969; March 31, 1969 and July 10, 1969, 10455/69; 15039/69; 19613/69; 23823/69 and 54150/69.

Signed and sealed this 20th day of June 1972.

(SEAL)
Attest:

EDWARD M. FLETCHER, JR.      ROBERT GOTTSCHALK
Attesting Officer              Commissioner of Patents

UNITED STATES PATENT OFFICE
CERTIFICATE OF CORRECTION

Patent No. 3,631,154     Dated December 28, 1971

Inventor(s) Takeo Kawaguchi et al

It is certified that error appears in the above-identified patent and that said Letters Patent are hereby corrected as shown below:

In column 1, line 7, the name of the assignee should read as follows:

Toagosei Chemical Industry Co., Ltd.

Signed and sealed this 20th day of February 1973.

(SEAL)
Attest:

EDWARD M. FLETCHER, JR.
Attesting Officer

ROBERT GOTTSCHALK
Commissioner of Patents